(No Model.)

E. HOLDEN.
FILTER BED.

No. 323,680. Patented Aug. 4, 1885.

Attest:
L. Lee
Henry J. Theberath

Inventor
Edgar Holden, per
Crane & Miller, Attys.

UNITED STATES PATENT OFFICE.

EDGAR HOLDEN, OF NEWARK, NEW JERSEY.

FILTER-BED.

SPECIFICATION forming part of Letters Patent No. 323,680, dated August 4, 1885.

Application filed August 30, 1884. (No model.)

*To all whom it may concern:*

Be it known that I, EDGAR HOLDEN, a citizen of the United States, residing at Newark, Essex county, New Jersey, have invented certain new and useful Improvements in Filter-Beds, fully described and represented in the following specification and the accompanying drawings, forming a part of the same.

This invention consists in a filter-bed, preferably of hydraulic cement, constructed with minute conical holes arranged with their smaller ends toward the flow of water.

Figure 1:
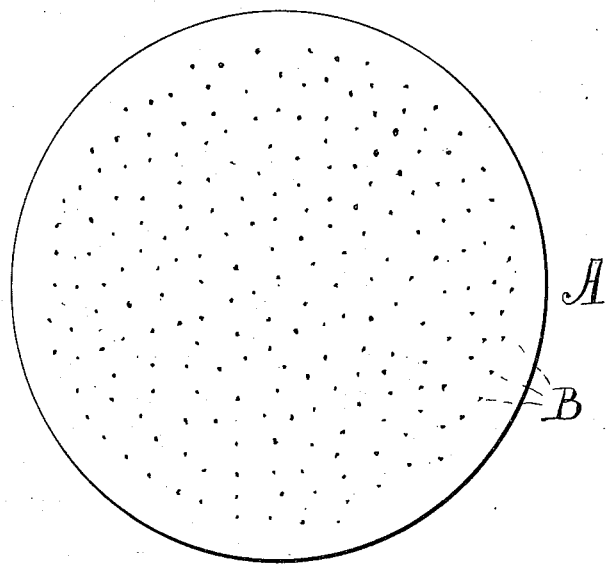
Figure 2:
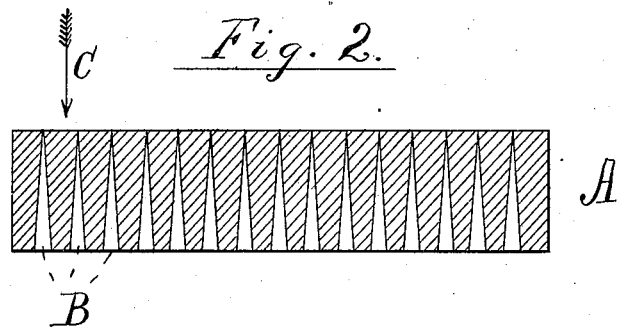

The invention is shown in the annexed drawings, in which Figure 1 is a plan of the filter-bed, showing the smaller ends of the conical holes; and Fig. 2 is a section of the same, showing the form of the holes.

A is the filter-bed, and B are the conical holes. By providing the substance of the filter-bed with such conical apertures I am enabled to form such minute openings in the operative surface, so as to secure a very remarkable filtering action without the aid of any superposed ingredients.

The plates are preferably made of hydraulic cement, because it may be easily molded and perforated while in a plastic state. The means which I have employed for making such plates consist in a mold made of either wood or metal— as a box of the same internal proportions as the desired plate—and having its bottom provided with perforations large enough to receive the roots of conical metallic pins. The desired number of such pins is inserted in a wooden or metal holder, and so disposed and projected as to enter the holes in the bottom of the mold and reach the upper side of its contents when the mold rests upon the holder. The mold is filled with plastic material in a suitable condition for forming a plate and retaining the apertures produced by the pins. The material in the mold is leveled off by a straight scraper, which is drawn across the mold with its edge resting upon the margin of the same. By the use of such scraper a uniform thickness may be produced in the contents, so that the conical pins may penetrate through the material equally at all parts. When the material is thus uniformly leveled, the pins are pressed through the holes and into the material within until their points appear at the upper surface. Should the thickness of the material exceed the height of the pins the operator may readily press the surface down with a piece of wood to the points of the pins without injury to the latter. The pins may, if preferred, be set loosely in the holder, so as to be withdrawn separately from the plate.

The pins may be made of brass, steel, or other material; but are preferably plated with metal not liable to rust when inserted in the wet cement. In lieu of pressing the pins into the plate after it is molded, they may be either removably or permanently fixed in the bottom of the mold, and the plastic material formed or pressed around the same to form the required apertures.

It is obvious that the plates may be molded of any desired form, and thus fitted to receptacles and openings of various shapes. By the use of hydraulic cement they may also be molded in contact with the walls of the receptacle, and therefore adherent to the sides of the vessel. In such an operation the lower edges of the receptacle would be first set in contact with the holder having the pins fixed therein.

As I find it possible in practice by using the ordinary brass pins not over an inch long—such as are commonly sold in papers—with solid heads, to produce holes varying from one-fortieth to one-sixtieth of an inch in diameter, the filter-plate (so perforated and so formed of material having a strong affinity for water) has a very different filtering action apart from any superposed loose materials.

From an inspection of Fig. 2 it will be seen that the flow of liquid toward the smaller end of the conical openings, as in the direction of the arrow C, tends greatly to prevent any clogging of such passages, as any loose particles that could enter the aperture at all would pass freely out of its large end.

Having thus fully described my invention, I claim the same as follows:

The filtering-plate herein shown and described, adapted to remove the impurities combined mechanically with the fluid, the same consisting in a plate provided with minute tapering holes having their smaller ends presented to the flow of the unfiltered fluid, substantially as and for the purpose set forth.

In testimony whereof I have hereunto set my hand in the presence of two subscribing witnesses.

EDGAR HOLDEN.

Witnesses:
 THOS. S. CRANE,
 EDWARD L. DOBBINS.